S. G. BARNARD.
ELECTRIC CIRCUIT TESTING DEVICE.
APPLICATION FILED JUNE 8, 1920.

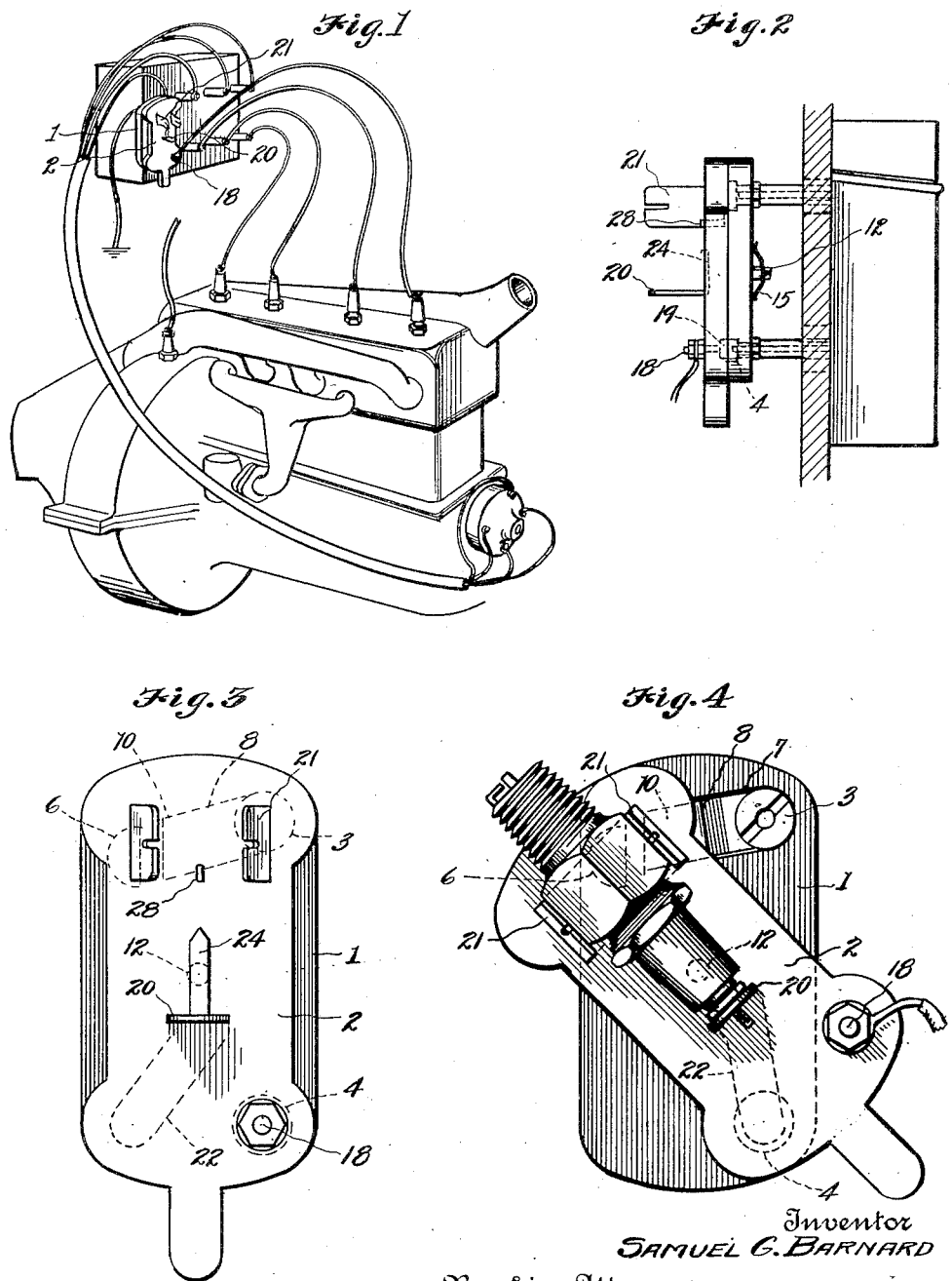

1,382,884.

Patented June 28, 1921.
2 SHEETS—SHEET 2.

Inventor
SAMUEL G. BARNARD
By his Attorney
Richard J. Cook

UNITED STATES PATENT OFFICE.

SAMUEL G. BARNARD, OF SEATTLE, WASHINGTON, ASSIGNOR OF ONE-HALF TO HUGO DOTZER, OF SEATTLE, WASHINGTON.

ELECTRIC-CIRCUIT-TESTING DEVICE.

1,382,884.  Specification of Letters Patent.  Patented June 28, 1921.

Application filed June 8, 1920. Serial No. 387,386.

*To all whom it may concern:*

Be it known that I, SAMUEL G. BARNARD, a citizen of the United States, and resident of the city of Seattle, county of King, and State of Washington, have invented certain new and useful Improvements in Electric-Circuit-Testing Devices, of which the following is a specification.

This invention relates to electric circuit testing devices, and more particularly to devices of that character for testing the efficiency of spark plugs and ignition coils; the principal object of the invention being to provide a testing device which may be easily attached to or incorporated with the electrical equipment of motor vehicles or combustion engines in general, without requiring any substantial alteration in the same equipment, and which, in its construction, includes a movably mounted part comprising circuit closing contact members which provide for the closing of electric circuits through the ignition system of the engine with that part in one position, but which provides the closing of electric circuits, through conducting members mounted on that part and wherein a spark plug may be placed, when the movable part is turned in another position, for the purpose of testing the efficiency of the plug, or coils, etc.

Since it is apparent that devices of this character could be and necessarily would be made in a number of different styles and forms to adapt them to the particular system to which they were to be applied, the device here shown is intended only to be representative of devices of this character in general with the understanding that changes in form or arrangement necessary for the installation with circuit members of various characters could be made without departing from the spirit of the invention.

Another object of the invention is to provide testing devices of the above character that may be incorporated in the electrical system, or mounted as permanent fixtures in the ignition equipment of motor vehicles or engines or which may be made as independent, demountable devices for testing purposes in general.

In accomplishing these and other objects of the invention, I have provided the improved details of construction, the preferred forms of which are illustrated in the accompanying drawings, wherein—

Figure 1 is a perspective view of a testing device embodied by the present invention, shown in its preferred manner of connection with the ignition system of a motor vehicle.

Fig. 2 is a side view of the same.

Fig. 3 is a front view of the device, in what is called running position.

Fig. 4 is a view of the parts in testing position.

Figure 5:
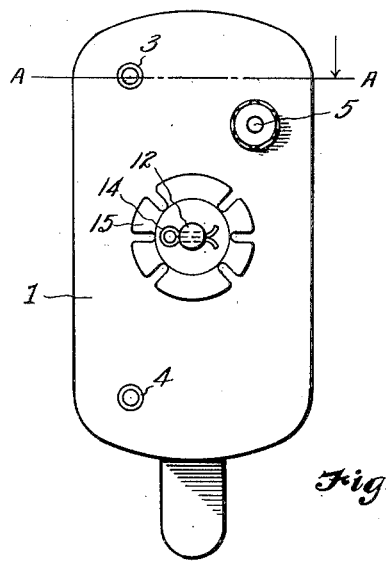
Fig. 5 is a back view of the device.
Figure 6:
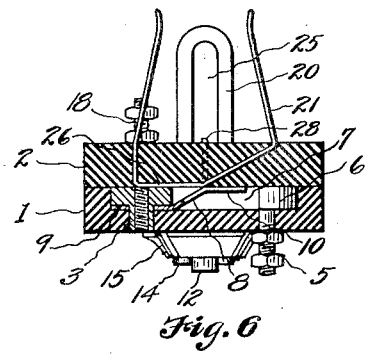
Fig. 6 is a sectional view of the same, on the line A—A of Fig. 5.
Figure 7:
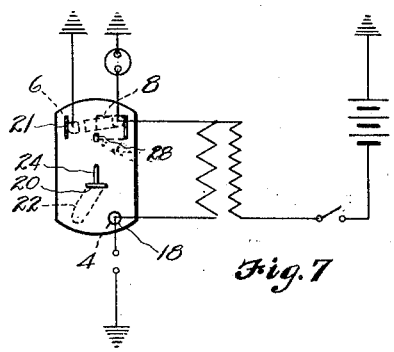
Fig. 7 is a diagrammatic view of a testing device adapted for use in connection with vibrating coils, showing the circuit connections when the device is in what is termed running or off position.

Referring more in detail to the several views of the drawings, wherein like reference numerals designate like parts: 1 and 2, respectively, designate supporting and movable switch members, both of which may be formed of non-conductive material, such as porcelain, fiber, rubber, bakelite; the back or supporting member being provided at the upper and lower corners at one side with contact screws 3 and 4, which serve to support the device, as will presently be described, and which, at their outer ends, are equipped with heads which lie flush with the outer face of the back member and serve not only as contact or circuit closing members but also as means for holding the device securely in place.

The upper corner of the supporting member 1, opposite the corner carrying the screw 3, embodies a binding post 5 that is provided with means at its back end for attaching a circuit, or so called ground wire, thereto and at its other end has a head portion 6, which lies flush with the forward surface of the member similarly as do the heads of the screws 3 and 4. Between the contacts, 3 and 5, the switch member 1 has a cut-out pocket 7 wherein a contact or plate 8 is disposed, said plate having an end portion 9 clamped beneath the head of screw 3 and an opposite end portion 10 turned forwardly to extend flush with the face of the supporting member and terminating at a short distance from the binding post head 6.

The movable switch member 2 is pivotally mounted on the member 1 by means of a post 12 that is fixed thereto, and extends revolubly through a central aperture in the member 1. A cotter key 14 is extended through the back end of the post or extension, and a spring washer 15 is placed between the key and member 1 to tension the blocks together sufficiently to hold them in any set or adjusted relation.

Mounted in the lower corner of the member 2 corresponding to the corner of member 1 which carries the screw 4, is a binding post 18, provided at its outer end with means for attaching a circuit wire thereto and at its inner end with a head 19 that lies flush with the inner face of the movable member and which is adapted to engage the screw 4 in a circuit closing contact when the member 2 is in one position, but which is disengaged therefrom when the member 2 is turned about its pivot post.

Mounted, respectively, in the central and upper end portion of the member 2 are lower and upper spark plug holding members, 20 and 21, respectively; the member 20 comprising a conductive metal strip that is extended through the member 2 and has its inner portion 22 inlaid in the inner face of the member 2 and is extended downwardly and laterally to the corner opposite the post 18 and its outer end extended at right angle from the block with a central strip 24 cut from and turned upwardly for a purpose presently described, leaving a slot 25 in the projecting portion.

The upper holding member 21 comprises a substantial U-shaped bracket with its base portion embedded in the movable member 2 except for a portion 26 which is exposed at the back of the plate to effect circuit closing connections with the post 5 when the plate is turned to testing position. The base of this bracket also has a pointed portion 28 turned outwardly therefrom to be exposed at the outer face of the member 2 spaced from the end of the strip 24 to form a safety or spark gap of a desired or required width for testing the efficiency of coils, etc.

Assuming that the testing device is so constructed and assembled, to attach the same as a permanent fixture in connection with the ignition system of a certain type of vehicle, wherein the coil box of the ignition system is mounted on the dashboard of the vehicle, as shown in Fig. 2, and the terminal posts of its several coils are extended to the forward side of the dash with wires leading therefrom to the engine spark plugs and the timing mechanism, the high tension wires (lower terminals) of any set of terminals is removed and the screw 4 applied to the lower terminal and the screw 3 applied to the upper terminal of that set, without changing existing connections of the latter. The post to which the screw 3 is applied being the terminal of a primary winding and the post to which screw 4 is applied being the terminal post of the secondary winding. The wire leading to the spark-plug is then attached to the binding post 18 and a separate connection is made from the post 5 to any metallic part of the vehicle frame or engine, commonly called a ground.

With the device mounted in this manner it is apparent that the circuit to the spark plug wire is closed through the contact of the heads of screw 4 and post 18, the unchanged timing wire of the primary circuit performing and conducting current through the timer, as previously, so that the vehicle engine will operate in its usual manner.

Figure 8:
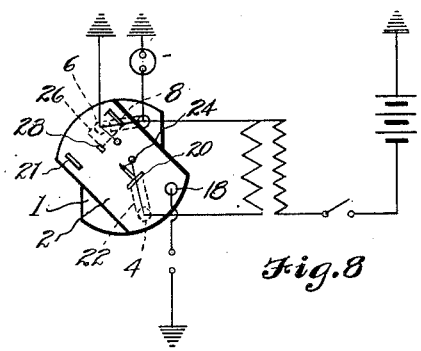
Fig. 8 is a similar view of the device in testing position, showing the circuits closed through the spark plug supports.

For the purpose of testing the efficiency of the coils the switch member 2 is moved pivotally on member 1 so that it will assume the position, as shown in Figs. 4 and 8; with the parts in this position, the inner end of the plate 22 contacts the head of the screw 4 and the base 26 of the bracket 21 bridges the head of the post 5 and plate 8, which is in electrical connection with screw 3. These connections established and the low tension circuit closed, will induce a high tension current in the coil, which, to complete its circuit has to jump the gap between the parts 24 and 28. The strength and quality of the spark indicates the efficiency and capacity of the coil.

For testing out spark-plugs, the plug to be tested is placed in the bracket 21 and against support 20, as is shown in Fig. 4, the members 1 and 2 are moved into the same relative position as for testing coils. A circuit through the device will then be closed through the plug and the spark jumping the gap between the spark plug points or electrodes will indicate the condition or efficiency of the spark plug.

Figure 9:
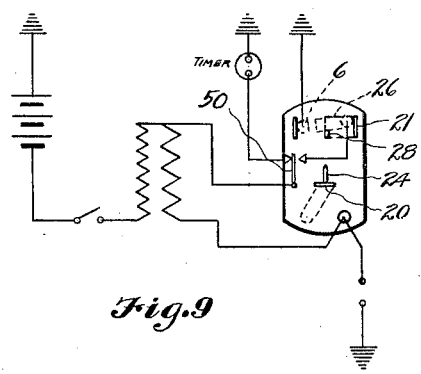
Figs. 9 and 10 are views, respectively, similar to the views of Figs. 7 and 8, illustrating one representative arrangement of the testing device for use in connection with electrical equipments or ignition system of non-vibrator types.
Figure 10:
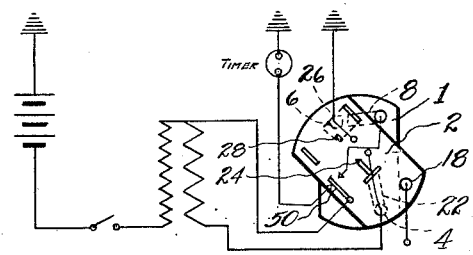

For using the device in connection with electrical equipments or ignition systems of the non-vibrator type an interrupter, as shown at 50 in Figs. 9 and 10, is added to the device, incorporated, attached, or separate, and connected in series with the primary circuit to make and break the circuit, as is required in testing.

What I claim as my invention is:

1. The combination with an electric circuit, of a circuit testing device, comprising a body member whereon means is provided for supporting a member to be tested, the said body member being movable to open or close a circuit through the supporting means.

2. A circuit testing device of the character described comprising relatively movable switch members; one of which has circuit contact members thereon applicable to binding posts or terminals of an electric circuit, and means on the other member for supporting a spark plug, that are movable into circuit closing relation with the first named contact members to close a circuit through the spark plug held therein, for the purpose set forth.

3. A circuit testing device of the character described comprising relatively movable switch members; one of which has contact members thereon applicable to binding posts or terminals of an electric circuit, and the other of which has a circuit wire connection thereon and means for supporting a spark plug, and movable into positions to close a circuit through the circuit wire connection or through the spark plug supporting members, for the purpose set forth.

4. A circuit testing device of the character described, comprising relatively movable switch members, one of which has contact members thereon applicable in circuit closing relation to contact points or terminals of an electric circuit, and the other of which has a circuit wire binding post thereon and spaced apart circuit closing members forming a sparking gap, movable with this member into positions to close a circuit through the circuit wire binding post or into position to close a circuit through the spaced apart members to effect a spark between the same.

5. A circuit testing device of the character described comprising a pair of pivotally joined switch blocks, one of which has contact members thereon applicable to binding posts or the like of an electric circuit and having a circuit wire binding post thereon, and the other of which has a circuit wire binding post thereon and spaced apart conductive members wherein a spark plug may be held in testing position, and said latter block being movable to one position to effect the closing of a circuit through its circuit wire binding post and in another position to close a circuit through the said conductive members, for the purpose set forth.

Signed at Seattle, Washington, this 29th day of May, 1920.

SAMUEL G. BARNARD.